United States Patent [19]

Byerly et al.

[11] Patent Number: 5,091,157
[45] Date of Patent: Feb. 25, 1992

[54] RECYCLE CONDUIT INSULATION ASSEMBLY

[75] Inventors: Harold L. Byerly, Houston; Bruno R. Kuhn, Nassau Bay, both of Tex.

[73] Assignee: Rollins Environmental Services (TX) Inc., Deer Park, Tex.

[21] Appl. No.: 516,484

[22] Filed: Apr. 30, 1990

[51] Int. Cl.$^5$ .............................................. B01J 8/10
[52] U.S. Cl. ................................... 422/209; 110/246; 202/100; 202/117; 202/136; 202/216; 422/234; 432/105
[58] Field of Search .............. 422/209, 234; 202/100, 202/117, 131, 136, 216, 218; 110/229, 230, 246, 226; 432/105, 106, 110, 118; 34/108, 128, 135, 136, 137

[56] References Cited

U.S. PATENT DOCUMENTS

| | | | |
|---|---|---|---|
| 1,959,772 | 5/1934 | Stalhane et al. | 432/118 |
| 1,980,828 | 11/1934 | Reed et al. | 202/131 |
| 3,607,121 | 9/1971 | Watson et al. | 422/234 |
| 4,243,381 | 1/1981 | Genevois et al. | 432/118 |
| 4,293,324 | 10/1981 | Saeman | 65/27 |
| 4,301,750 | 11/1981 | Rito et al. | 110/246 |
| 4,338,868 | 7/1982 | Lientz | 110/246 |
| 4,563,246 | 1/1986 | Reed et al. | 202/100 |
| 4,676,740 | 6/1987 | deBerus | 432/118 |
| 4,724,777 | 2/1988 | Reed et al. | 432/118 |
| 4,938,171 | 7/1990 | Detzel et al. | 422/145 |

Primary Examiner—Peter Kratz
Attorney, Agent, or Firm—Thompson, Hine and Flory

[57] ABSTRACT

A recycle conduit insulation assembly for use with a helical recycle conduit of a rotary reactor of the type having a rotating, horizontally-oriented, cylindrical chamber for burning materials therein and a quantity of particulate, inorganic material within the chamber for conveying heat energy to material to be burned. The insulation assembly includes a plurality of shell elements, each comprising a cylinder enclosing a portion of the conduit and being arranged in overlapping relation, a plurality of mounting rings, each attached to and extending radially from the conduit and having a T-shape in section for supporting the shell elements at ends thereof, and a pumpable refractory mixture substantially filling the insulating space between the shell elements and conduit. Preferably, the shell elements are attached to the mounting rings only at one end of each shell element and have unattached ends which overlap the next adjacent shell element to form a continuous covering which can contract or expand longitudinally in response to thermal expansion and contraction of the associated conduit. The mounting rings are segmented and include slots which permit expansion and contraction from the underlying conduit without destruction of the mounting ring.

16 Claims, 2 Drawing Sheets

RECYCLE CONDUIT INSULATION ASSEMBLY

BACKGROUND OF THE INVENTION

The present invention relates to rotary reactors for burning organic material which use inorganic particulate material to convey heat energy to the organic material to be burned and, more particularly, to assemblies for insulating the external recycle conduit of a rotary reactor.

A common device for incinerating hazardous materials and other toxic wastes is the rotary reactor. A rotary reactor includes a horizontally-oriented cylindrical drum or chamber which is rotated slowly about a horizontal axis concentric with the chamber by electric motors which engage ring gears mounted on the chamber.

The ends of the chamber are open and are received within annular hoods. The engagement includes a labyrinth seal which permits relative rotation between the chamber and the stationary hoods. At the inlet hood, fuel is injected into the chamber and burned to provide the heat for combusting waste, and other nozzles and orifices are provided to inject the waste material to be burned. Elongate lifters are mounted on the interior of the chamber and are oriented parallel to a central axis rotation of the chamber. Rotation of the chamber brings the lifters successively through a bed of inorganic particulate material, such as sand, located in the bottom of the chamber. As the lifters, loaded with sand, are rotated upwardly and above the sand bed, they gradually empty the sand downwardly back into the bed, thereby allowing the sand to be heated and intermingled with the waste materials to be burned. This action allows the sand to convey heat absorbed from the burning fuel to the waste material.

As the reactor chamber rotates, the inorganic particulate material progresses toward the end of the chamber opposite the fuel and waste inlets. In order to convey the particulate material back to the fuel and waste inlets, rotary reactors include a recycle conduit or chute. Such an apparatus is shown in Reed et al. U.S. Pat. No. 4,563,246. In one embodiment of that patent, the recycle chute comprises a helical conduit coiling about the outer periphery of the cylindrical chamber. The helical conduit communicates with the chamber at its front and rear ends and coils oppositely to the direction of rotation of the chamber. Particulate material entering the recycle conduit at the "downstream" end of the chamber flows to the "upstream" end adjacent the fuel and waste inlets by the rotation of the chamber.

Such recycle conduits typically are made of 253MA stainless steel which is appropriate for withstanding the high temperatures and corrosive environment within the chamber. However, this material rapidly radiates heat from the particulate material being conveyed to the upstream end of the chamber.

Accordingly, there is a need for insulating the recycle conduits of rotary reactors to minimize the heat loss from the particulate material recycled as it travels the length of the helical conduit. Conventional fiber insulating materials rapidly deteriorate as a result of the rotating action of the recycle conduit and the expansion and contraction of the conduit, predominately in a longitudinal direction, as a result of thermal stresses. Consequently, there is a need for insulating recycle conduits with a system that can accommodate the dimensional changes resulting from thermal expansion and contractions and which is not destroyed by the rotating movement of the conduit.

SUMMARY OF THE INVENTION

The present invention is a recycle conduit insulation assembly for use with a rotary reactor which is capable of handling the high temperature levels (on the order of 1600° F.) as well as the stresses imposed by the expansion and contraction of the recycle conduit due to changes in temperature. Further, the present invention is not affected by the rotating movement of the conduit on which it is mounted. The insulation assembly includes a plurality of shell elements, each consisting of a cylinder enclosing a portion of the conduit and being arranged in overlapping relation along the length of the conduit. The shell elements are supported by a plurality of mounting rings attached to the conduit along its length and extending radially outwardly from the conduit. The shell elements are each attached at one end to a mounting ring by welding and are unattached at an opposite end but overlap the next adjacent shell element. Consequently, the shell elements are capable of sliding longitudinally relative to each other and therefore can accommodate longitudinal dimensional changes resulting from thermal stresses.

The space between the shell elements and the conduit is filled with a pumpable refractory having insulation capabilities. The refractory is contained within a space defined by the conduit surface, the associated shell element and the mounting rings at either end. As a result, substantially the entire length of the helical recycle conduit is insulated by a contiguous series of such units.

The shell elements preferably are formed of galvanized sheet metal which is cut and formed into the cylindrical shell elements. Each shell element includes a pair of half couplings which permit the liquid, pumpable refractory mixture to be injected into the space between the shell element and the conduit. The mounting rings are welded to the conduit and are segmented so that they can accommodate changes in a radial dimension resulting from thermal stresses.

Accordingly, it is an object of the present invention to provide an insulating assembly for a recycle conduit of a rotary reactor; an insulating assembly which is inexpensive in comparison to other insulating assemblies yet is able to withstand the dimensional changes resulting from thermal stresses imposed by the recycle conduit which it insulates; and an insulating assembly which is relatively easy to mount on a recycle conduit and to maintain and repair.

Other objects and advantages will be apparent from the following description, the accompanying drawings and the appended claims.

DETAILED DESCRIPTION

Figure 1:
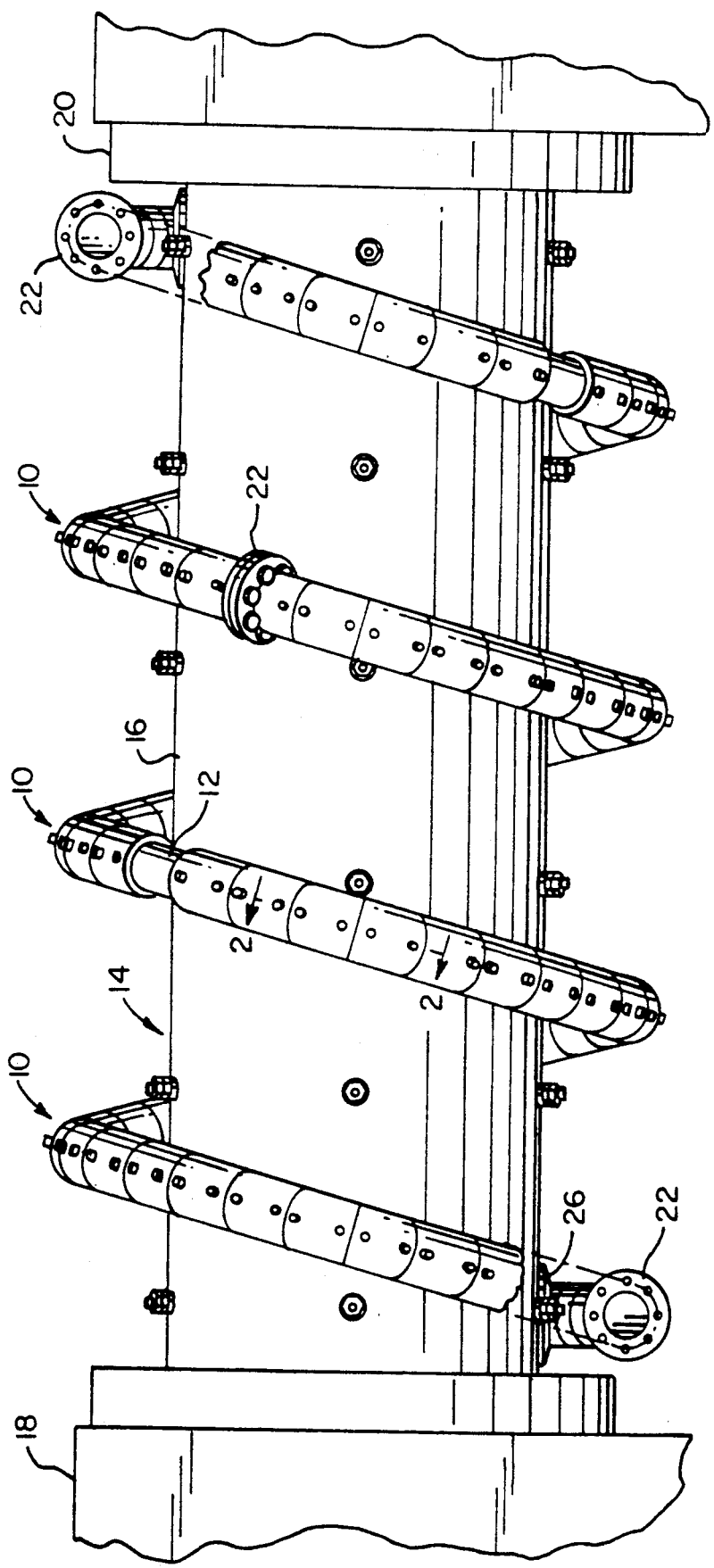
FIG. 1 is a somewhat schematic, side elevation of a rotary reactor having a recycle conduit fitted with the insulation assembly of the present invention.

As shown in FIG. 1, the recycle conduit insulation assembly, generally designated 10, is mounted on the recycle conduit 12 of a rotary reactor 14. The rotary reactor 14 includes a horizontally-oriented, cylindrical chamber 16 which is supported for rotation between stationary upstream and downstream hoods 18, 20, respectively.

The recycle conduit 12 comprises segments of cylindrical pipe fabricated from 253MA stainless steel connected at mating flanges 22 and extending in a helical path about the chamber 16. The downstream end of the conduit 12 communicates with the interior of the chamber 16 at the downstream end at connection 24. Similarly, the upstream end of the conduit 12 communicates with the interior of the chamber 16 at connection 26. As the chamber 16 rotates, particulate inorganic material within the chamber enters the conduit 12 through the connection 24 and progresses through the conduit to re-enter the chamber 16 at connection 26. The rotation of the reactor causes the particulate inorganic material to progress outwardly through the helical conduit 12.

Figure 2:
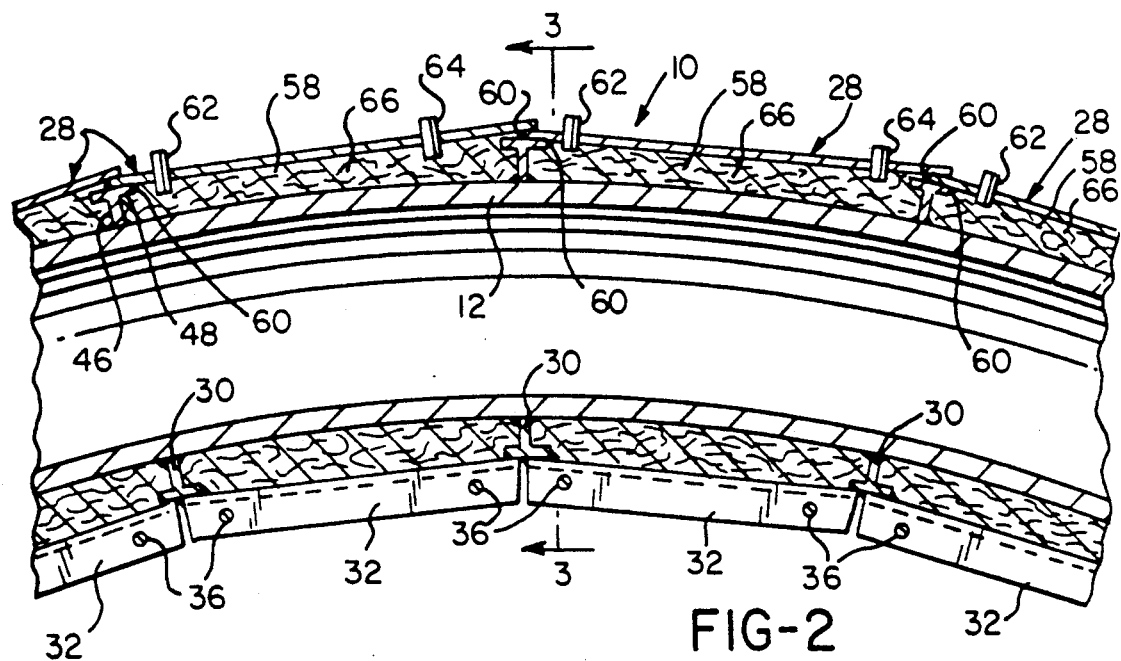
FIG. 2 is a detail side elevation in section taken at line 2—2 of FIG. 1.
Figure 3:
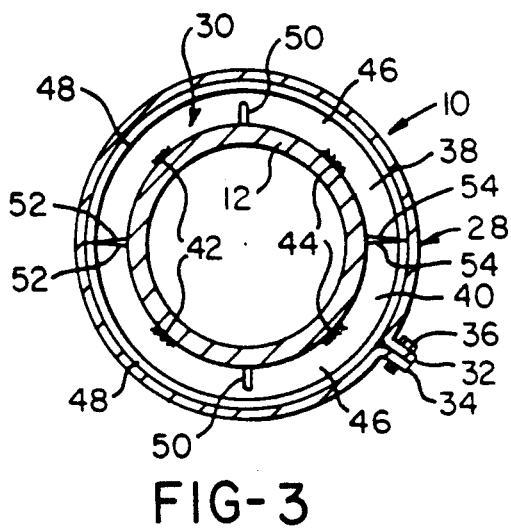
FIG. 3 is a section taken at line 3—3 of FIG. 2.

As shown in FIGS. 2 and 3, the insulation assembly 10 comprises a plurality of shell elements 28 supported by and spaced from the conduit 12 by ring members 30. Each shell element 28 consists of a substantially rectangular sheet of 16 gauge galvanized sheet metal bent to form a cylinder having mating flanges 32, 34 at its ends, joined by sheet metal screws 36.

Figure 4:
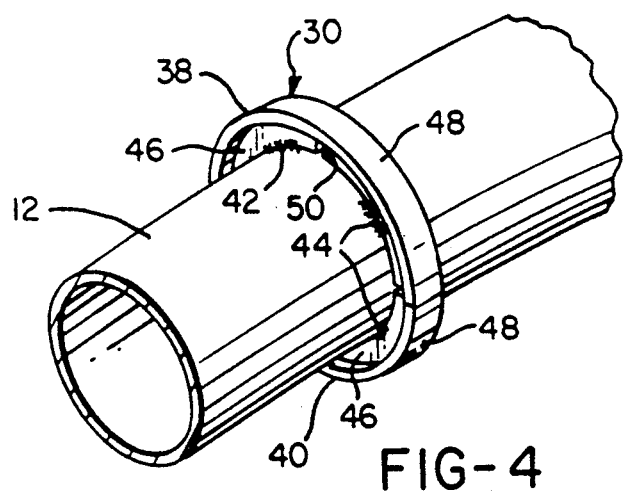
FIG. 4 is a detail perspective view of the insulation assembly of FIG. 1 showing a mounting ring.

As shown in FIGS. 3 and 4, each mounting ring 30 comprises a pair of opposing ring segments 38, 40 attached to the conduit by a pair of weldments 42, 44. Each ring segment 38, 40 is substantially T-shaped in cross section (see FIG. 2) and is fabricated from 304 stainless steel. The T-shape includes a radially-extending web 46 and an axially-extending support flange 48. The webs 46 of the ring segments 38, 40 each include a radially-extending notch 50 midway between the ends 52, 54. The ends 52, 54 are bevelled to form triangular slots when they meet. The weldments 42, 44 are positioned midway between the notches 50 and the ends 52, 54. This relationship between the ends 52, 54, notches 50 and weldments 42, 44 provides a flexible mounting for the ring segments 38, 40 which accommodates expansion and contraction of the conduit 12 in a radial direction.

As shown in FIG. 2, each shell element 28 extends between and is supported by two mounting rings 30, thereby defining an insulation space 58 between the shell element 28, conduit 12 and contiguous mounting rings 30. Each shell element 28 is attached to the support flange 48 of a single mounting ring 30 by weldments 60. The shell elements 28 are sized such that the free, unwelded ends overlap the welded end of the next adjacent shell element 28. Accordingly, the sequence of shell elements 28 is capable of expanding or contracting longitudinally in response to longitudinal dimensional changes of the conduit 12 on which they are mounted.

Each shell element 28 includes a pair of half couplings 62, 64, positioned adjacent ends thereof which enable a pumpable refractory mixture to be injected into the insulation spaces 58. The pumpable refractory mixture 66 preferably has insulation capabilities, and an appropriate type is Fiber Frax GS, produced by Carborundum Corporation.

The insulation assembly 10 is mounted on a conduit 12 in the following manner. The ring segments 38, 40 of the mounting rings 30 are first welded to the conduit at intervals corresponding to the lengths of the shell elements 28 which are to be used. It should be noted that the spacing of mounting rings 30 need not be uniform; spacing decreases with a decrease in the radius of curvature of the conduit. Accordingly, spacing of mounting rings around elbows and tight curves is shorter than for long gradual curving segments. Each mounting ring 30 is attached by four weldments spaced as shown in FIG. 3.

The shell elements are then mounted on the support flanges 48 of the mounting rings 30 and are welded at their ends in overlapping relation as shown in FIG. 2. The refractory mixture 66 is pumped through either coupling 62 or 64 for each shell element 28 until the mixture emerges from the other coupling, thereby indicating that the insulation space 58 is substantially full. The couplings 62, 64 are then capped and the assembly is ready for use.

While the form of apparatus herein described constitutes a preferred embodiment of the invention, it is to be understood that other equivalent components to those shown and described may be used without departing from the scope of the invention.

What is claimed is:

1. For use with a rotary having rotation, horizontally-oriented cylindrical chamber for burning materials therein, a quantity of particulate, inorganic material within said chamber for conveying heat energy to material to be burned, and a helical, substantially cylindrical conduit extending about said chamber and communicating with opposite ends thereof for conveying said particulate material from one end of said chamber to an opposite and thereof as said chamber rotates, an insulation assembly comprising:

means forming a plurality of shell elements for substantially enclosing said conduit in a spaced relation therefrom, thereby forming an insulating space between said shell means and said conduit, said shell elements being arranged in overlapping relation along said conduit;

means for mounting said shell elements on said conduit, whereby said shell elements slide relative to each other in response to longitudinal movement of said mounting means in response to thermal stresses imposed on said conduit; and means, contained within said insulating space, for providing an insulating layer to said conduit.

2. The assembly of claim 1 wherein said assembly extends substantially an entire length of said conduit.

3. The assembly of claim 1 wherein each of said shell elements comprises a cylinder enclosing a portion of said conduit.

4. The assembly of claim 3 wherein said mounting means includes a plurality of mounting rings, each of said rings being attached to and extending radially from said conduit.

5. The assembly of claim 4 wherein each of said cylinders is attached at an end to a different one of said mounting rings.

6. The assembly of claim 5 wherein each of said cylinders extends between and is supported at its ends by two of said rings.

7. The assembly of claim 6 wherein each of said cylinders is attached at an end thereof to one of said rings and is unattached at an opposite end thereof, whereby said assembly is capable of expanding and contracting with said conduit as said conduit expands and contracts from changes in temperature.

8. The assembly of claim 7 wherein each of said shell elements includes coupling means for receiving pumpable insulation material into said insulating space.

9. The assembly of claim 8 wherein each of said cylinders is made from a substantially rectangular sheet of metallic material, formed into a cylinder shape and having longitudinal ends of said sheet bent radially outwardly to form flanges shaped to abut each other along their lengths.

10. The assembly of claim 9 further comprising means for fastening said flanges to each other.

11. The assembly of claim 10 wherein said fastening means comprises screws.

12. The assembly of claim 9 wherein said sheet comprises galvanized sheet metal.

13. The assembly of claim 4 wherein each of said mounting rings has a T-shape in a radial, longitudinal cross section.

14. The assembly of claim 13 wherein each of said mounting rings includes radially-extending slot means for imparting flexibility to said mounting rings in response to thermal expansion of said associated conduit.

15. The assembly of claim 13 wherein each of said mounting rings has a longitudinally-extending flange supporting overlapping portions of adjacent ones of said shell elements, said flange being coaxial with said conduit.

16. For use with a rotary reactor having a rotating, horizontally oriented, cylindrical chamber for burning materials therein, a quantity of particulate, inorganic material within said chamber for conveying heat energy to material to be burned and a helical, substantially cylindrical conduit extending about said chamber and communicating with opposite ends thereof for conveying said particulate material from one end of said chamber to an opposite end thereof as said chamber rotates, an insulation assembly comprising:

means forming a shell for substantially enclosing said conduit in a spaced relation, thereby forming an insulating space between said shell means and said conduit, said shell means including a plurality of contiguous shell elements, each comprising a cylinder enclosing a portion of said conduit, said cylinders being arranged in overlapping relation;

means for mounting said shell means on said conduit, said mounting means including a plurality of mounting rings, each of said rings being attached to and extending radially from said conduit and having a T-shape in a radial, longitudinal cross section, said rings including an annular flange concentric with said conduit and a radially-extending web attaching said flange to said conduit, said flanges being spaced along said conduit to support said cylinders at ends thereof, only one end of each cylinder being attached to one of said flanges, whereby said cylinders form a substantially continuous covering for said conduit sufficiently flexible to expand and contract with said conduit as said conduit change in temperature;

coupling means extending through said cylinders for pumping insulating material therethrough to said insulating space; and a pumpable refractory mixture substantially filling said insulating space.

* * * * *